(12) United States Patent
Reynolds et al.

(10) Patent No.: US 10,146,388 B2
(45) Date of Patent: Dec. 4, 2018

(54) CAPACITIVE SENSING IN AN LED DISPLAY (71) Applicant: SYNAPTICS INCORPORATED, San Jose, CA (US)

(72) Inventors: Joseph Kurth Reynolds, San Jose, CA (US); Stephen L. Morein, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 15/452,274

(22) Filed: Mar. 7, 2017

(65) Prior Publication Data

US 2017/0262095 A1    Sep. 14, 2017

Related U.S. Application Data

(60) Provisional application No. 62/305,209, filed on Mar. 8, 2016.

(51) Int. Cl.
| | |
|---|---|
| G09G 3/32 | (2016.01) |
| G06F 3/041 | (2006.01) |
| G06F 3/044 | (2006.01) |
| G09G 3/3233 | (2016.01) |

(52) U.S. Cl.
CPC ............ G06F 3/044 (2013.01); G06F 3/0412 (2013.01); G06F 3/0416 (2013.01); G09G 3/32 (2013.01); G09G 3/3233 (2013.01); G09G 2300/0426 (2013.01); G09G 2330/028 (2013.01)

(58) Field of Classification Search
CPC .................. G06F 3/044; G09G 3/32
USPC ................................. 345/156–174
See application file for complete search history.

(56) References Cited

U.S. PATENT DOCUMENTS

| | | | | |
|---|---|---|---|---|
| 6,198,642 B1* | 3/2001 | Kociecki | ............. | H02M 1/4225 307/150 |
| 8,766,950 B1* | 7/2014 | Morein | ................. | G06F 3/0416 345/174 |
| 8,975,825 B2* | 3/2015 | Hu | ..................... | H05B 33/0854 315/239 |

(Continued)

OTHER PUBLICATIONS

PCT/US2017/021104—International Search Report and Written Opinion dated Jun. 16, 2017, consists of 12 pages.

*Primary Examiner* — Prabodh M Dharia
(74) *Attorney, Agent, or Firm* — Patterson + Sheridan, LLP (57) ABSTRACT

A processing system for an integrated display and capacitive sensing device, where the display includes light-emitting diode (LED) pixels. The processing system includes isolated supply domains having inputs that receive an anode voltage and a cathode voltage, first outputs that supply modulated anode voltages, and second outputs that modulated cathode voltages, where the modulated anode voltages and the modulated cathode voltages are constant with respect to each other and modulated with respect to an external reference voltage. The processing system additionally includes a multiplexer circuit having inputs coupled the isolated supply domains, the anode voltage, and the cathode voltage, and having outputs coupled to the LED pixels. Further, the processing system includes control logic configured to control the multiplexer circuit to selectively supply the anode voltage and the cathode voltage, or the modulated anode voltages and the modulated cathode voltages, to the LED pixels.

20 Claims, 9 Drawing Sheets

(56) References Cited

U.S. PATENT DOCUMENTS

| | | | | |
|---|---|---|---|---|
| 2007/0080905 A1* | 4/2007 | Takahara | G09G 3/3233 | 345/76 |
| 2007/0268026 A1* | 11/2007 | Reynolds | G01D 5/24 | 324/686 |
| 2010/0013791 A1* | 1/2010 | Haga | G06F 3/0412 | 345/174 |
| 2010/0253638 A1 | 10/2010 | Yousefpor et al. | | |
| 2011/0025629 A1* | 2/2011 | Grivna | G06F 3/0416 | 345/173 |
| 2011/0134051 A1* | 6/2011 | Lin | G06F 3/0412 | 345/173 |
| 2011/0148474 A1* | 6/2011 | Cook | G11C 7/1051 | 327/108 |
| 2012/0044195 A1* | 2/2012 | Nakanishi | G06F 3/0412 | 345/174 |
| 2012/0281027 A1* | 11/2012 | Kim | G09G 3/3406 | 345/690 |
| 2012/0300349 A1* | 11/2012 | Abou-Khalil | H02H 9/046 | 361/56 |
| 2013/0021306 A1* | 1/2013 | Kuo | G09G 3/20 | 345/204 |
| 2013/0027413 A1* | 1/2013 | Jayavant | G06F 1/325 | 345/520 |
| 2013/0181942 A1* | 7/2013 | Bulea | G06F 3/044 | 345/174 |
| 2014/0118235 A1* | 5/2014 | Hong | G09G 5/008 | 345/87 |
| 2014/0132158 A1* | 5/2014 | Land | G09G 3/20 | 315/152 |
| 2014/0160097 A1* | 6/2014 | Kang | G06F 3/041 | 345/204 |
| 2014/0267137 A1* | 9/2014 | Solven | G06F 3/0416 | 345/174 |
| 2014/0306723 A1* | 10/2014 | Salter | H03K 17/955 | 324/658 |
| 2015/0091843 A1 | 4/2015 | Ludden | | |
| 2015/0091850 A1 | 4/2015 | Morein et al. | | |
| 2015/0179133 A1 | 6/2015 | Lee | | |
| 2015/0187315 A1* | 7/2015 | Park | G09G 3/3685 | 345/99 |
| 2015/0220138 A1* | 8/2015 | Jones | H04L 12/2803 | 713/323 |
| 2015/0378465 A1* | 12/2015 | Shih | G06F 3/044 | 345/174 |
| 2016/0019827 A1 | 1/2016 | Lee et al. | | |
| 2016/0054583 A1* | 2/2016 | Berthelot | G02C 5/126 | 351/137 |
| 2016/0109986 A1* | 4/2016 | Morein | G06F 3/0412 | 345/174 |
| 2016/0195977 A1* | 7/2016 | Reynolds | G06F 3/0416 | 345/174 |
| 2016/0335986 A1* | 11/2016 | Bae | G09G 5/005 | |
| 2017/0003779 A1* | 1/2017 | Reynolds | G06F 3/044 | |
| 2017/0068388 A1* | 3/2017 | Kim | G06F 3/044 | |
| 2017/0098407 A1* | 4/2017 | Jeong | G09G 3/2051 | |
| 2017/0185096 A1* | 6/2017 | Rueger | G05F 3/262 | |
| 2017/0187551 A1* | 6/2017 | Lukanc | H04L 25/03019 | |
| 2018/0040609 A1* | 2/2018 | Maeda | H01L 21/822 | |

\* cited by examiner

FIG. 8

CAPACITIVE SENSING IN AN LED DISPLAY

CROSS-REFERENCE TO RELATED APPLICATIONS

This application claims priority to U.S. Provisional Patent Application Ser. No. 62/305,209, filed Mar. 8, 2016, which is incorporated by reference herein in its entirety.

BACKGROUND

Field of the Disclosure

Embodiments of disclosure generally relate to capacitive sensors and, more particularly, capacitive sensing in a light-emitting diode (LED) display.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In an embodiment, a processing system for an integrated display and capacitive sensing device, where the display includes light-emitting diode (LED) pixels, is described. The processing system includes: isolated supply domains having inputs that receive an anode voltage and a cathode voltage for a diode, first outputs that supply modulated anode voltages, and second outputs that modulated cathode voltages, where the modulated anode voltages and the modulated cathode voltages are constant with respect to each other and modulated with respect to an external reference voltage; a multiplexer circuit having inputs coupled the isolated supply domains, the anode voltage, and the cathode voltage, and having outputs coupled to the LED pixels; and control logic configured to control the multiplexer circuit to selectively supply the anode voltage and the cathode voltage, or the modulated anode voltages and the modulated cathode voltages, to the LED pixels.

In another embodiment, an input device includes: a display having light-emitting diode (LED) pixels and a processing system. The processing system includes: isolated supply domains having inputs that receive an anode voltage and a cathode voltage, first outputs that supply modulated anode voltages, and second outputs that modulated cathode voltages, where the modulated anode voltages and the modulated cathode voltages are constant with respect to each other and modulated with respect to an external reference voltage; a multiplexer circuit having inputs coupled the isolated supply domains, the anode voltage, and the cathode voltage, and having outputs coupled to the LED pixels; and control logic configured to control the multiplexer circuit to selectively supply the anode voltage and the cathode voltage, or the modulated anode voltages and the modulated cathode voltages, to the LED pixels.

In another embodiment, a method of driving an integrated display and capacitive sensing device, where the display including light-emitting diode (LED) pixels, is described. The method includes: generating an anode voltage and a cathode voltage; generating, from the anode voltage and the cathode voltage, isolated and modulated anode voltages and isolated and modulated cathode voltages, where the isolated and modulated anode voltages and the isolated and modulated cathode voltages are constant with respect to each other and modulated with respect to an external reference voltage; coupling the anode voltage and the cathode voltage to the LED pixels at a first time; coupling the isolated and modulated anode voltages and the isolate that diode and receive modulated current from cathode voltages of a LED pixel at a second time; and performing capacitive sensing using the LED pixels at the second time.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

Figure 1A:
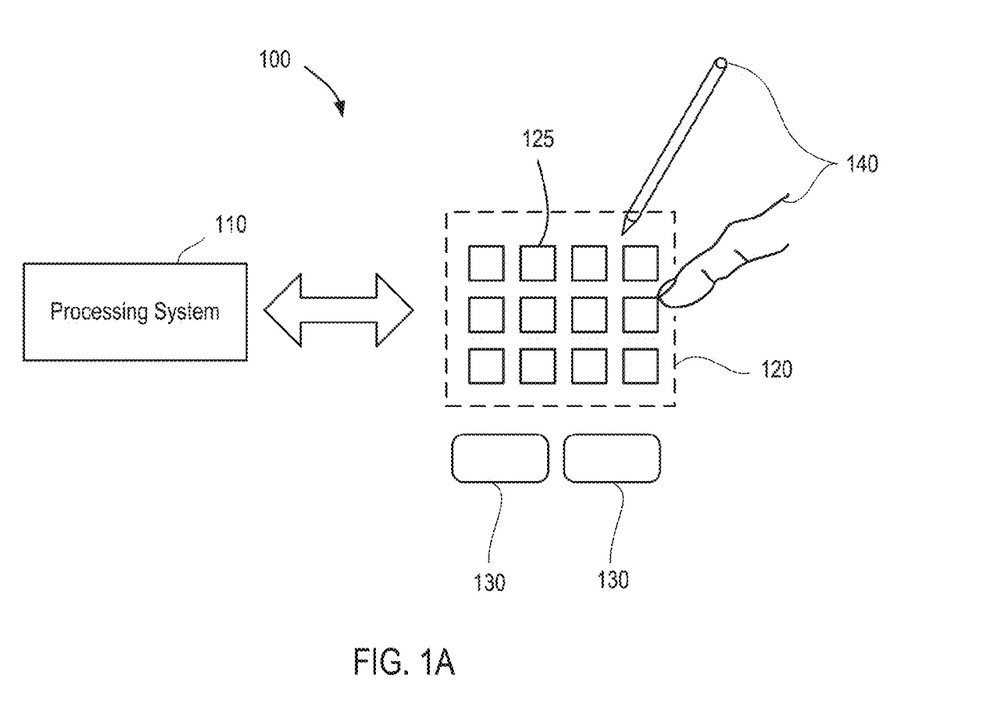
FIG. 1A is a block diagram of an exemplary input device according to an embodiment described herein.

FIG. 1A is a block diagram of an exemplary input device 100 in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In FIG. 1A, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1A.

The sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques. In an embodiment, the processing system 110 operates the sensing elements to implement touch nodes 125. A touch node 125 is an area in sensing region 120 in which the processing system 110 can detect a change in capacitance due to the presence of input objects 140.

Some implementations are configured to provide images that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, modulated current, or the like.

Some capacitive implementations utilize arrays or other regular or irregular patterns of capacitive sensing elements to create electric fields. In some capacitive implementations, separate sensing elements may be ohm ically shorted together to form larger sensor electrodes. Some capacitive implementations utilize resistive sheets, which may be uniformly resistive. Some sensing elements may be integrated or combined with the display device (e.g. diode anode or cathode) or they may be separate (e.g. on another electrically isolated layer) from the display device electrodes.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Figure 1B:
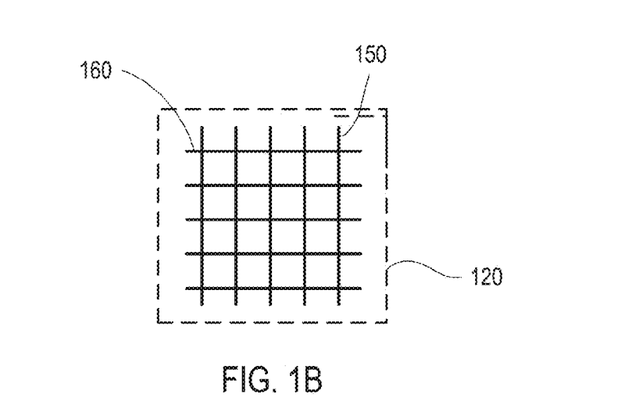
FIG. 1B is a block diagram depicting an alternative arrangement of sensor electrodes for the input device of FIG. 1A.

FIG. 1B is a block diagram depicting an alternative arrangement of sensor electrodes in the sensing region 120. As shown in FIG. 1B, the input device 100 includes receiver electrodes 150 and transmitter electrodes 160 disposed in the sensing region 120. Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes 160 (also "transmitter electrodes" or "transmitters") and one or more receiver sensor electrodes 150 (also "receiver electrodes" or "receivers"). Transmitter sensor electrodes 160 may be modulated relative to a reference voltage (e.g., system ground) to transmit transmitter signals. Receiver sensor electrodes 150 may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

Returning to FIG. 1A, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes (e.g. the receiver electrodes may be segmented cathode electrodes of the display). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1A shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110. In one embodiment, OLED display driver circuitry and touch sensing circuitry may be combined into a single Integrated Circuit (TDDI).

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
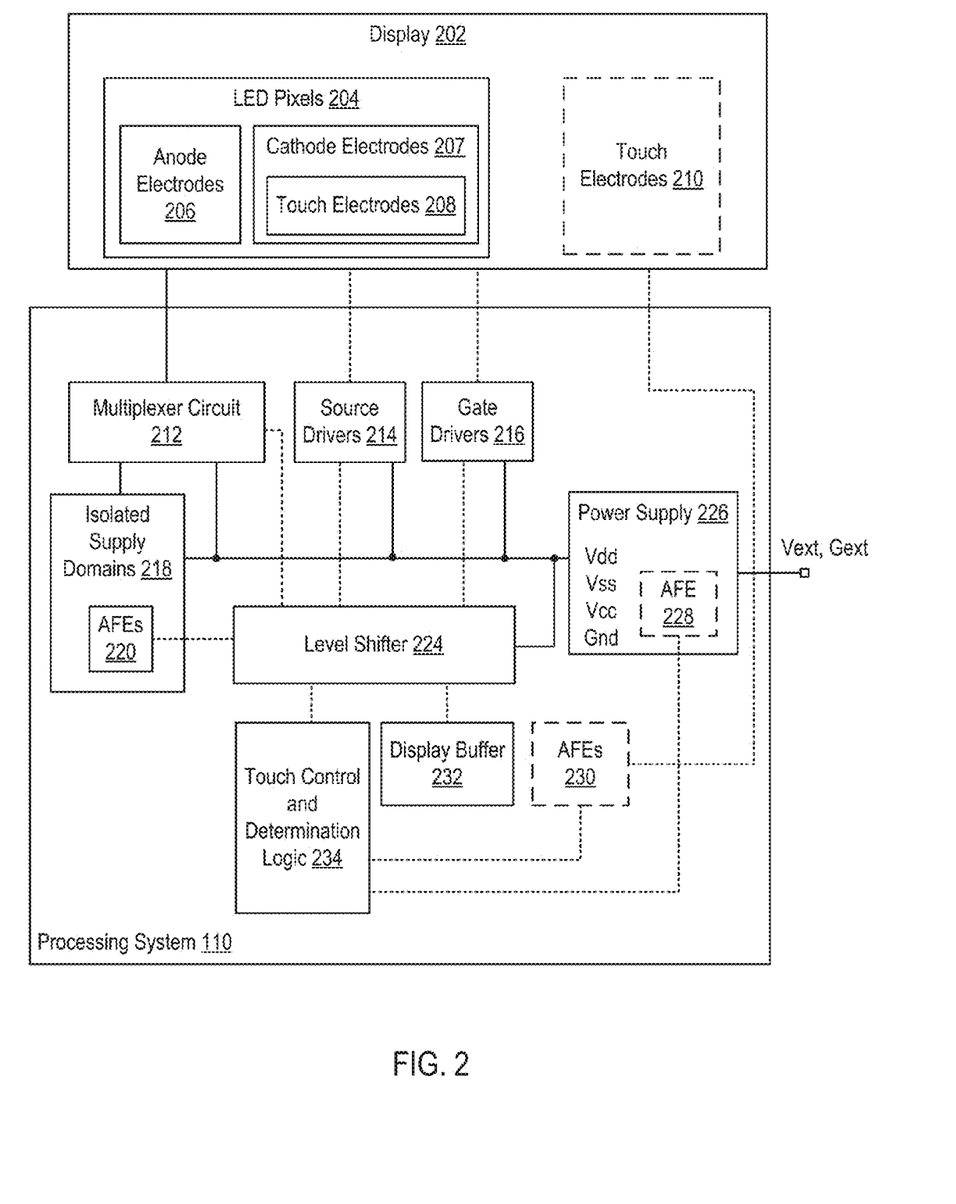
FIG. 2 is a block diagram illustrating example details of the input device according to some embodiments.

FIG. 2 is a block diagram illustrating example details of the input device 100 according to some embodiments. As shown in FIG. 2, the processing system 110 is coupled to a display 202. In an embodiment, the processing system 110 comprises a single integrated controller, such as an application specific integrated circuit (ASIC). In another embodiment, the processing system 110 can include a plurality of integrated circuits. The processing system 110 can be coupled to other integrated circuits, such as a host processor (not shown).

The display 202 includes a plurality of light-emitting diode (LED) pixels 204, such as OLED pixels. As shown in FIG. 2, the LED pixels 204 represent either pixels or subpixels of the display 202. The LED pixels 204 include anode electrodes 206 and cathode electrodes 207. Each anode electrode 206 is coupled to one or more of the LED pixels 204. Likewise, each cathode electrode 207 is coupled to one or more of the LED pixels 204. In embodiments, the processing system 110 operates the LED pixels 204 such that the cathode electrodes 207 also function as a plurality of touch electrodes 208 used for capacitive sensing. Note that the cathode electrodes 207 can be segmented into isolated electrodes by a number of patterning processes (e.g. photolithography and etch, photolithography and liftoff, laser ablation, evaporation shadow mask, self-aligned evaporation mask by undercutting of OLED dielectric layers). In alternative embodiments, the processing system 110 operates the LED pixels 204 such that the anode electrodes 206 also function as a plurality of touch electrodes used for capacitive sensing. Note that the diodes as described are "top emitting" LEDs, which are coupled directly to and illuminate through the cathode. In some embodiments, "bottom emitting" LEDs are used that are coupled directly to and illuminate through the anode. Symmetric drive circuits can be designed that reverse the circuit (e.g. anode and cathode) connections to the LED, but produce substantially similar electrical and visual results.

In some embodiments, the touch electrodes 208 form the touch nodes 125. The processing system 110 operates the touch electrodes 208 using absolute capacitive sensing to obtain capacitive images based on the touch nodes 125. In other embodiments, the display 202 can include additional touch electrodes 210. The touch electrodes 210 can be disposed on a layer of the display 202 between an input surface and the LED pixels 204. The touch electrodes 210 can cross the touch electrodes 208 to form the touch nodes 125. The processing system 110 operates the touch electrodes 210 as transmitters and the touch electrodes 208 as receivers and obtains capacitive images using transcapacitive sensing. The touch electrodes 210 are optional and can be omitted in certain embodiments of the display 202. The touch electrodes 210 may be placed on a separate layer (e.g. above the encapsulation layer for an OLED display).

The processing system 110 includes display driver circuitry 213, a multiplexer circuit 212, a plurality of isolated supply domains 218, and a power supply 226. The display driver circuitry 213 can include source drivers 214 or both the source drivers 214 and gate drivers 216. In some embodiments, the gate drivers 216 can be part of the display 202. The power supply 226 provides a supply domain for the gate drivers 216, the source drivers 214, the multiplexer circuit 212, and the isolated supply domains 218. The power supply 226 generates various supply voltages based on an external voltage (Vext) and an external electrical ground (Gext). In the example, the power supply 226 generates Vdd, Vss, Vcc, and system ground (Gnd) supply voltages. The supply voltages Vdd and Vss may be anode and cathode voltages, respectively, for the LED pixels 204. The supply voltage Vcc is used to drive the various circuits in the supply domain of the power supply 226 (e.g., circuits of the gate drivers 216, the source drivers 214, AFEs 220, etc.). The supply voltage Gnd provides a local ground for the supply domain of the power supply 226 separate from a system ground.

In an embodiment, the power supply 226 is configured to modulate each of the supply voltages with respect to an external reference (e.g., Gext, Earth ground, etc.). Note that the system ground is typically highly coupled to Earth ground, as are the user inputs (e.g. ignoring any interference signals). In such case, the supply voltages Vdd, Vss, Vcc, and Gnd are constant with respect to each other over time, but vary over time with respect to the reference. In embodiments, the power supply 226 can selectively apply or not apply modulation to the supply voltages (e.g. modulation may not take place during low power modes, interference measurement modes, etc.).

The gate drivers 216 and the source drivers 214 drive the display 202 to display an image using the LED pixels 204. The gate drivers 216 select LED pixels 204 through gate switches, and the source drivers 214 can update the selected LED pixels 204 driver current, according to display data. The processing system 110 can include a display buffer 232 for receiving display data (e.g., from a graphics processing unit (GPU) (not shown)). In an embodiment, the display buffer 232 is not in the supply domain of the power supply 226. In an embodiment, a high speed serial interface (not shown) connecting the display buffer 232 to the GPU is not in the supply domain of the power supply 226. Thus, the processing system 110 can include a level shifter 224 for converting the output of the display buffer 232 to the supply domain used by the gate drivers 216 and the source drivers 214.

The multiplexer circuit 212 supplies selected anode and cathode voltages to the anode electrodes 206 and the cathode electrodes 207, respectively, for biasing (e.g. illuminating by driving current) the LED pixels 204. The multiplexer circuit 212 may include an output per touch node 125, each of which supplies a selected cathode voltage. In one embodiment, both the anode and cathode are isolated and modulated by the multiplexer circuit.

Figure 3:
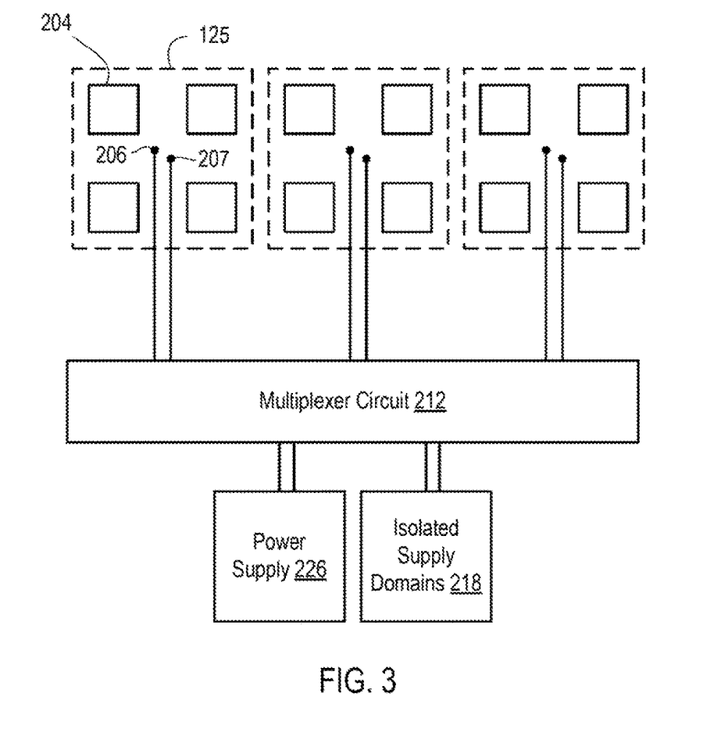
FIG. 3 is a schematic diagram depicting an arrangement of light emitting diode (LED) pixels and touch nodes according to an embodiment.

FIG. 3 is a schematic diagram depicting an arrangement of the LED pixels 204 and touch nodes 125 according to an embodiment. As shown in the example of FIG. 3, each touch node 125 is implemented using electrodes of four LED pixels 204. Each touch node 125 is formed by a touch electrode 208 (e.g., the cathodes 207 or anodes 206 of the respective LED pixels 204) or by an intersection of such a touch electrode 208 and a touch electrode 210. In general, each touch node 125 can be implemented using one or more LED pixels (or RGBW sub-pixels) 204. Note that different types of independently controlled LEDs may provide different colors of light and be grouped as sub-pixels into a single pixel to provide a full color display. Alternatively, monochrome displays may use a single display color LED, or (e.g. for white LEDs) a filter may be placed over the LED to provide a multi-color display. In some sub-pixel rendering implementations, the distribution of different colors may have more of one color sub-pixel than another (e.g. Pentile) or a single sub-pixel may respond to more than one display input pixel (e.g. Delta). The multiplexer circuit 212 provides a pair of anode and cathode voltages as output per touch node 125 for use by the respective LED pixel(s) 204 that implement each touch node 125. Inputs to the multiplexer circuit 212 include supply voltages output by the power supply 226 and modulated anode and modulated cathode voltages output to each of the isolated supply domains 218. Thus, the multiplexer circuit 212 can provide anode and cathode voltages from the power supply 226 to zero or more of the LED pixels 204. The multiplexer circuit 212 can provide isolated and modulated anode voltages and isolated and modulated cathode voltages from the isolated supply domains 218 to zero or more of the LED pixels 204. There can be the same number of isolated supply domains 218 as there are touch nodes 125. Alternatively, there can be less isolated supply domains 218 than there are touch nodes 125.

In the present example, there are three touch nodes 125 and thus the multiplexer 212 has three outputs. However, in general, the LED pixels 204 can implement any number of touch nodes 125 and the multiplexer 212 includes the corresponding number of outputs. While each touch node 125 is shown as being implemented using cathodes of four LED pixels 204, in general each touch node 125 can be implemented using any number LED pixels 204 using either cathodes or anodes. Further, while each touch node 125 is shown as being implemented by a rectangular arrangement of LED pixels 204, in general each touch node 125 can be implemented using LED pixels 204 having non-rectangular arrangements.

Returning to FIG. 2, each isolated supply domain 218 includes circuitry for generating modulated anode and cathode voltages for biasing LED pixels 204. The modulated anode and cathode voltages are modulated with respect to the external reference (e.g., Gext) and constant with respect to each other over time (e.g. self guarding). The modulated anode and cathode voltages generated by each isolated supply domain 218 are isolated from the power supply 226. In an example, each isolated supply domain 218 includes an analog front end (AFE) 220. In alternative embodiments, a multiplexer and/or isolation switches may be used to reduce the required number of AFEs or to protect the AFE from spurious signals. In an absolute capacitive sensing scheme, each AFE 220 measures the amount of charge required to hold a touch electrode 208 (e.g., cathode electrode 207) constant with respect to an anode electrode 206 as the modulated anode and cathode voltages are applied by the isolated supply domain 218 relative to a user input. This amount of charge will change due to the absence/presence of input object(s) in the sensing region 120. Each AFE 220 converts modulated currents and sensed charge into a voltage and outputs a resulting signal for processing by touch control and determination logic 234. Note that the AFE may contain typical elements, such as a demodulator, a filter, and an analog-to digital converter (ADC) to provide results to the touch control logic. In an embodiment, the touch control and determination logic 234 is not in the domain of the power supply 226. Thus, the resulting signals output by the AFEs 220 can pass through the level shifter 224. Further, control signals output by the touch control and determination logic 234 for controlling the AFEs 220 can pass through the level shifter 224. In an alternative embodiment, the isolated supply domains may be held at a constant voltage relative to system ground, and separate transmitter electrodes (e.g. additional electrodes 210) are modulated to capacitively sense user input.

The touch control and determination logic 234 can supply control signals to the AFEs 220. In an embodiment, the touch control and determination logic 234 also supplies a control signal to the multiplexing circuit 212 (through the level shifter 224). In this manner, the touch control and determination logic 234 can control operation of the AFEs 220 and the multiplexing circuit 212 to perform a capacitive sensing operation. The touch control and determination logic 234 can process resulting signals output by the AFEs 220 to determine changes in capacitance of the touch nodes 125 (generating a "capacitive image" or "capacitive frame"). Input object(s) can be detected and tracked using the capacitive images. A filtered baseline image may be maintained and a touch threshold or ratio of delta-capacitances form the baseline used to determine the presence or relative location of one or more user inputs.

In an embodiment, the processing system 110 can include AFEs 230 coupled to the touch electrodes 210. The AFEs 230 are disposed outside of the isolated supply domains 218. The AFEs 230 provide resulting signals to the touch control and determination logic 234. The AFEs 230 can be used in a transcapacitive sensing scheme where the touch electrodes 208 are used as transmitters and the touch electrodes 210 are used as receivers. In embodiments, the processing system 110 can include the AFEs 230 and omit the AFEs 220. Alternatively, the processing system 110 can include the AFEs 220 and omit the AFEs 230. In yet another alternative, the processing system 110 can include both the AFEs 230 and the AFEs 220.

In an embodiment, the power supply 226 can include an AFE 228. The AFE 228 can function similar to an AFE 220, but for the entire display 202. The AFE 228 provides a resulting signal to the touch control and determination logic 234. Whereas each AFE 220 operates within an individual isolated power supply domain 218, the AFE 228 operates in the domain of the power supply 226 (i.e., that of the entire display 202). The AFE 220 can be used to determine if an object is absent/present in the sensing region 120 as a whole and/or to determine the interference environment or coupling to Earth ground.

Figure 4:
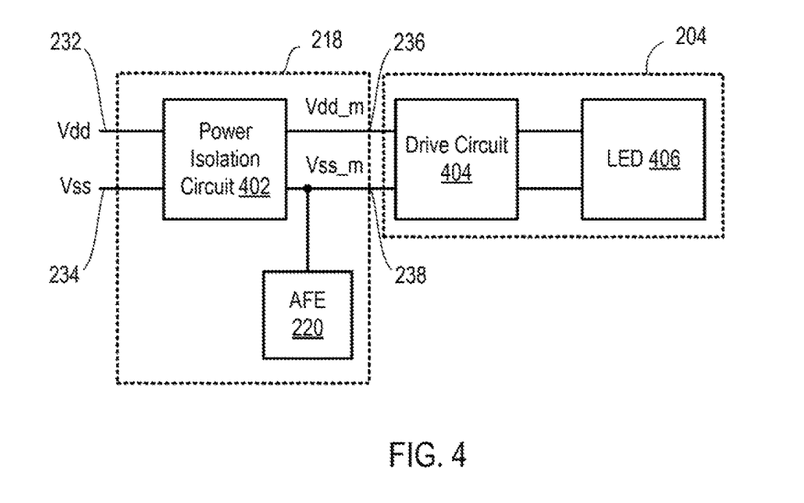
FIG. 4 is a block diagram depicting a logical arrangement of an isolated supply domain and an LED pixel according to an embodiment.

FIG. 4 is a block diagram depicting a logical arrangement of an isolated supply domain 218 and an LED pixel 204 according to an embodiment. The isolated supply domain 218 includes a power isolation circuit 402, inputs 232 and 234, outputs 236 and 238 and an AFE 220. The LED pixel 204 includes a drive circuit 404 and an LED 406. The drive circuit 404 supplies anode and cathode voltages to the LED 406 to bias the LED 406. The drive circuit 404 also provides source and gate electrode voltages (shown in FIG. 5). The power isolation circuit 402 receives the anode and cathode voltages (Vdd and Vss) from the power supply 226 via inputs 232 and 234. The power isolation circuit 402 generates modulated and isolated anode and cathode voltages Vdd_m and Vss_m from the anode and cathode voltages (Vdd and Vss). The isolated supply domain 218 supplies the modulated and isolated anode and cathode voltages (Vdd_m and Vss_m) via outputs 236 and 238 to the drive circuit 404 for biasing the LED 406. The AFE 220 is coupled to one output of the power isolation circuit 402. In the example, the AFE 220 is coupled to the cathode voltage output of the power isolation circuit 402 (e.g., the touch electrodes 208 are cathode electrodes 207). The AFE 220 can include a charge integrated, current-conveyer, or the like coupled to the cathode voltage output of the power isolation circuit 402.

The AFE 220 can further include a demodulator, filter(s), an analog-to-digital converter (ADC), and like type circuit components for processing and digitizing signals.

Figure 5A:
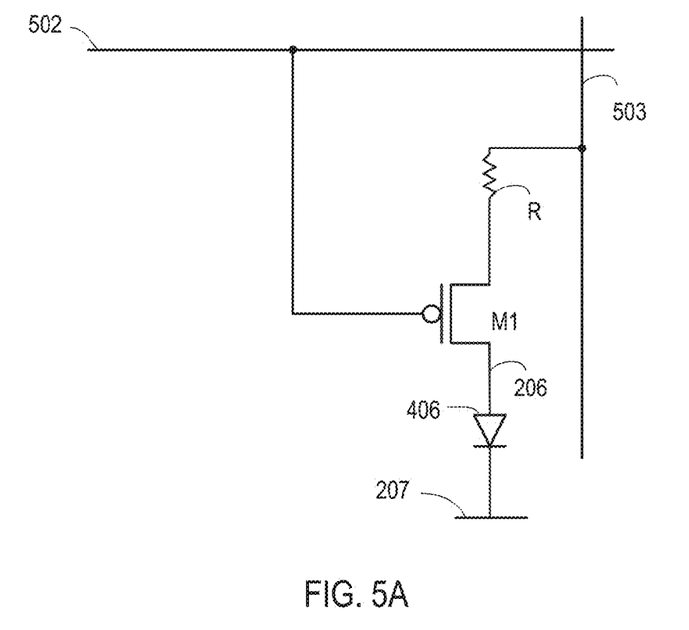
FIGS. 5A-5D are schematic diagrams depicting embodiments of a drive circuit and an LED of an LED pixel.

FIG. 5A is a schematic diagram depicting the drive circuit 404 and the LED 406 of an LED pixel 204 according to an embodiment. The LED 406 includes a cathode terminal coupled to a cathode electrode 207 and an anode terminal coupled to an anode electrode 206. A supply line 503 is coupled to the anode electrode 206 through a current limiting resistor R. The drive circuit 404 includes a p-channel FET M1 acting as a gate selection switch. The FET M1 can be a thin-film transistor (TFT). A gate of the FET M1 is coupled to a gate line 502. A source of the FET M1 is coupled to the supply line 503 through the resistor R. A drain of the FET M1 is coupled to the anode electrode 206.

Figure 5B:
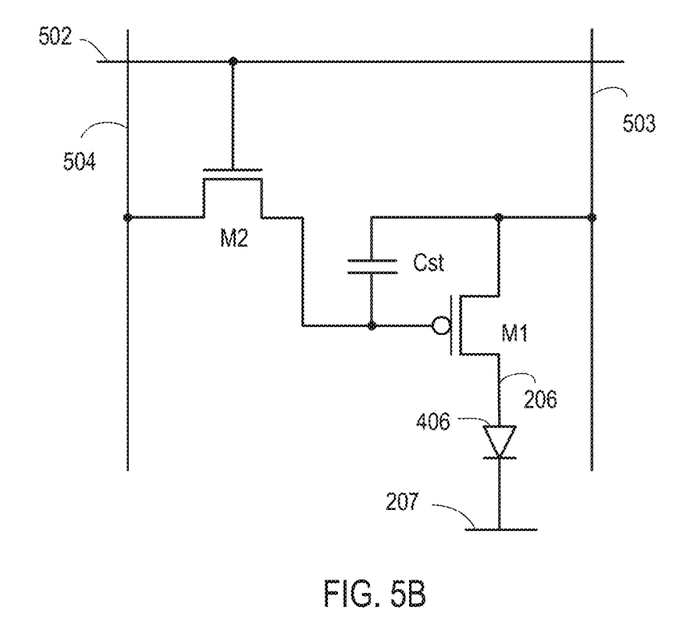

FIG. 5B is a schematic diagram depicting the drive circuit 404 and the LED 406 of an LED pixel 204 according to another embodiment. In FIG. 5B, the drive circuit 404 includes an n-channel field effect transistor (FET) M2, the p-channel FET M1, and a capacitor Cst. The FETs M1 and M2 can be TFTs. The LED 406 is coupled between the anode electrode 206 and the cathode electrode 207 to allow current to flow through the LED 406 when voltage at the anode electrode 206 is higher than voltage at the cathode electrode 207 (e.g., when the LED 406 is forward-biased). The LED 406 can emit light when forward-biased, although due to trapped charges the current may not flow until a threshold voltage is reached and the current may be substantially non-linear with applied voltage (e.g. exponential or quadratic) requiring a current limiting scheme. When voltage at the anode electrode 206 is lower than the voltage at the cathode electrode 207, substantially no current flows through the LED 406 (e.g., the LED is reverse-biased) and the capacitance across the diode is reduced. The LED 406 emits substantially no light when reversed-biased.

In FIG. 5B, the resistor R is omitted and the drain of the transistor M1 is coupled to the supply line 503. The capacitor Cst is coupled between the supply line 503 and the gate of the transistor M1. The gate and source of the transistor M1 are capacitively coupled by way of the capacitor Cst. The drain of the transistor M1 is coupled to the anode electrode 206. A gate of the transistor M2 is coupled to the gate line 502. A drain of the transistor M2 is coupled to the gate of the transistor M1. A source of the transistor M2 is coupled to a source line 504.

To emit light (when displaying an image), the LED 406 can be forward-biased (and can thus have current flowing through it). To forward-bias the LED 406, the voltage at the gate line 502 can be sufficiently high to turn on the transistor M2. When the transistor M2 is on, the transistor M2 can act substantially as a short-circuit and can cause the voltage at the source line 504 to be substantially mirrored at the gate of the transistor M1 and the voltage stored on Cst. The voltage at the source line 504, and thus the voltage at the gate of the transistor M1, can be sufficiently low relative to the anode supply voltage to turn on the current-controlling transistor M1. When the transistor M1 is on, the transistor M1 can act substantially as current source and can cause the voltage at the anode electrode 206 to be maintained at a voltage for a controlled current through the LED 406. For the LED 406 to be forward biased, the voltage at the anode electrode 206 must be higher than the voltage at the cathode electrode 207. The configurations of the drive circuit shown in FIGS. 5A and 5B are merely two examples of various types of drive circuits that can be included in an LED display.

In operation, the transistor M1 in FIG. 5B acts as a current source to control the brightness of the LED 406. As discussed above, the modulated anode and cathode voltages output by the power isolation circuit 402 may be coupled to the anode electrode 206 and the cathode electrode 207, respectively. Since the modulated anode and cathode voltages are constant with respect to each other, the voltage across the LED 406 is constant. Further, since the voltages of the anode electrode 206 and the cathode electrode 207 are modulated with respect to an external reference, either of those electrodes can be used for capacitive sensing operations. For example, in transcapacitive sensing, the anode electrode 206 or cathode electrode 207 may act as a transmitter. In absolute capacitive sensing, charge conducted onto the cathode electrode 207 through user input can be independently measured by the AFE 220 while maintaining a constant voltage across the LED 406 and while an image-dependent current flows through the LED 406. In other embodiments, the AFE 220 is coupled to the anode electrode 206 and operates similarly as described above.

Figure 5C:
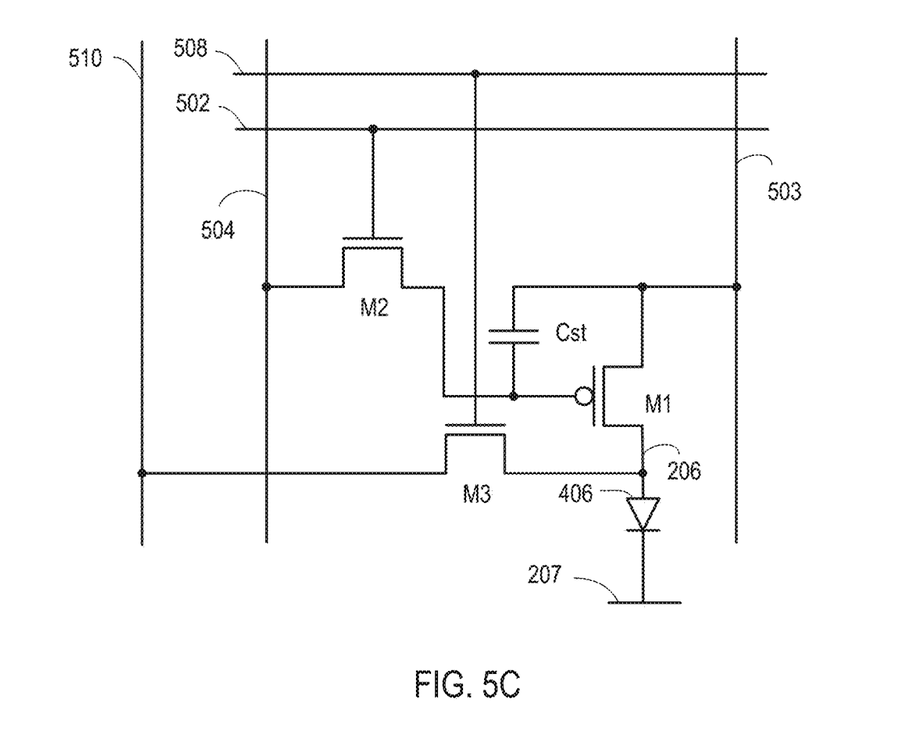

Those skilled in the art will appreciate that the drive circuit 404 can include other circuit arrangements, which are similar to that shown in FIG. 5B and operate similarly. For example FIG. 5C shows a schematic diagram of a three transistor drive circuit that allows multiplexed connection of the anode electrode 206 to a guarding or receiving line 510 through the transistor M3 by a selection line 508. The drive circuit 404 of FIG. 5C is constructed similarly to the embodiment of FIG. 5B, but further includes the line 510, the line 508, and the n-channel FET M3. A source of the transistor M3 is coupled to the line 510. A gate of the transistor M3 is coupled to the line 508. A drain of the transistor M3 is coupled to the anode electrode 206.

Figure 5D:
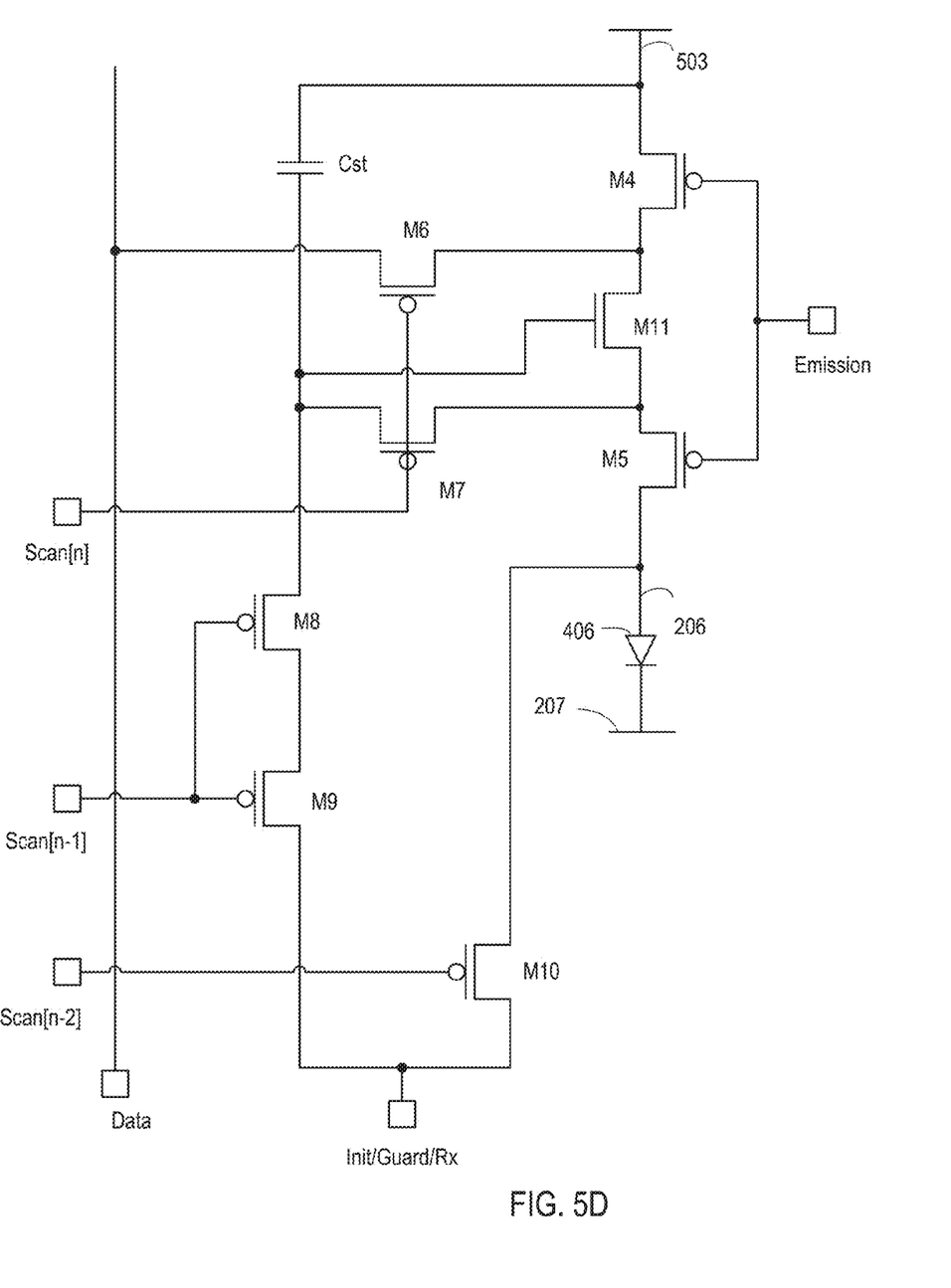

FIG. 5D is a schematic diagram depicting yet another embodiment of the drive circuit 404. FIG. 5D shows a seven transistor drive circuit that allows emission control through an emission selection electrode ("Emission") and multiple gate controls for p-channel FETs M4-M10. By addition of transistors to the drive circuit 404, multiplexing of sensing electrodes, guarding electrodes, and transmitting electrodes can achieved while still allowing display operation using the same diode and power supplies. These transistors and electrodes may be used for both display modes and sensing modes, as well and others (e.g. emission control to reduce display brightness, transistor threshold voltage compensation, etc.).

In particular, the drive circuit 404 shown in FIG. 5D includes p-channel FETs M4-M10 and an n-channel FET M11. Gates of the FETs M4 and M5 are coupled to Emission. A source of the FET M5 is coupled to a source of the FET M11. A drain of the FET M4 is coupled to a drain of the FET M11. A source of the FET M4 is coupled to the supply line 503. A drain of the FET M5 is coupled to the anode electrode 206. A gate of the FET M7 is coupled to a first scan electrode (Scan[n]). A drain of the FET M7 is coupled to the source of the FET M11. A source of the FET M7 is coupled to a source of the FET M8. A gate of the FET M11 is also coupled to the source of the FET M8. A drain of the FET M6 is coupled to the drain of the FET M11. A gate of the FET M6 is coupled to the gate of the FET M7. A source of the FET M6 is coupled to a data electrode (Data). A drain of the FET M8 is coupled to a source of the FET M9. A drain of the FET M9 is coupled to an init/guard/rx electrode (Init/Guard/Rx). A gate of the FET M8 is coupled to the gate of the FET M9, which is coupled to a second scan electrode (Scan[n−1]). A source of the FET M10 is coupled to the anode electrode 206. A drain of the FET M10 is coupled to the Init/Guard/Rx electrode. A gate of the FET M10 is coupled to a third scan electrode (Scan[n−2]). The capacitor Cst is coupled between the supply line 503 and the gate of the FET M11.

Figure 6:
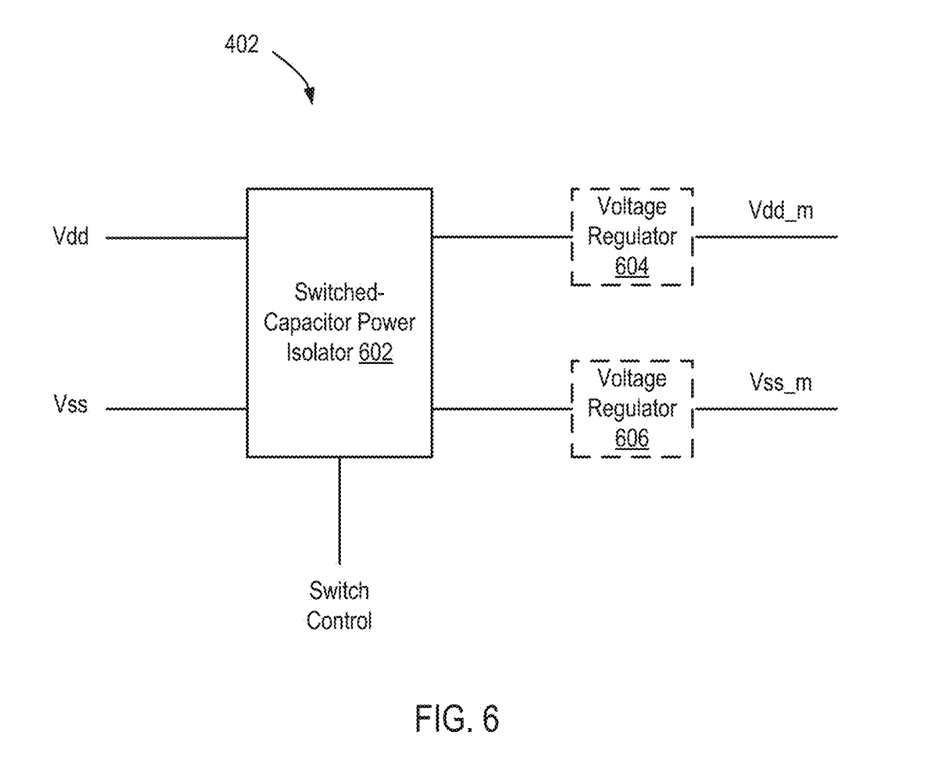
FIG. 6 is a block diagram depicting a power isolation circuit according to an embodiment.

FIG. 6 is a block diagram depicting the power isolation circuit 402 according to an embodiment. The power isolation circuit 402 includes a switched-capacitor power isolator 602. The switched-capacitor power isolator 602 includes a pair of inputs to receive the anode and cathode voltages (Vdd, Vss) and a pair of outputs that provide modulated anode and cathode supply voltages (Vdd_m, Vss_m). The switched-capacitor power isolator 602 also includes switch control input for controlling the switches therein. A modulated control signal is coupled to the switch control input of the switched-capacitor power isolator 602 to generate the modulated anode supply and cathode voltages. Further, the modulated anode and cathode voltages are isolated from the anode and cathode voltages of the power supply 226. This allows the AFE 220 to independently measure charge conducted onto the cathode electrode 207 through user input with a "top emission" LED display.

Figure 7:
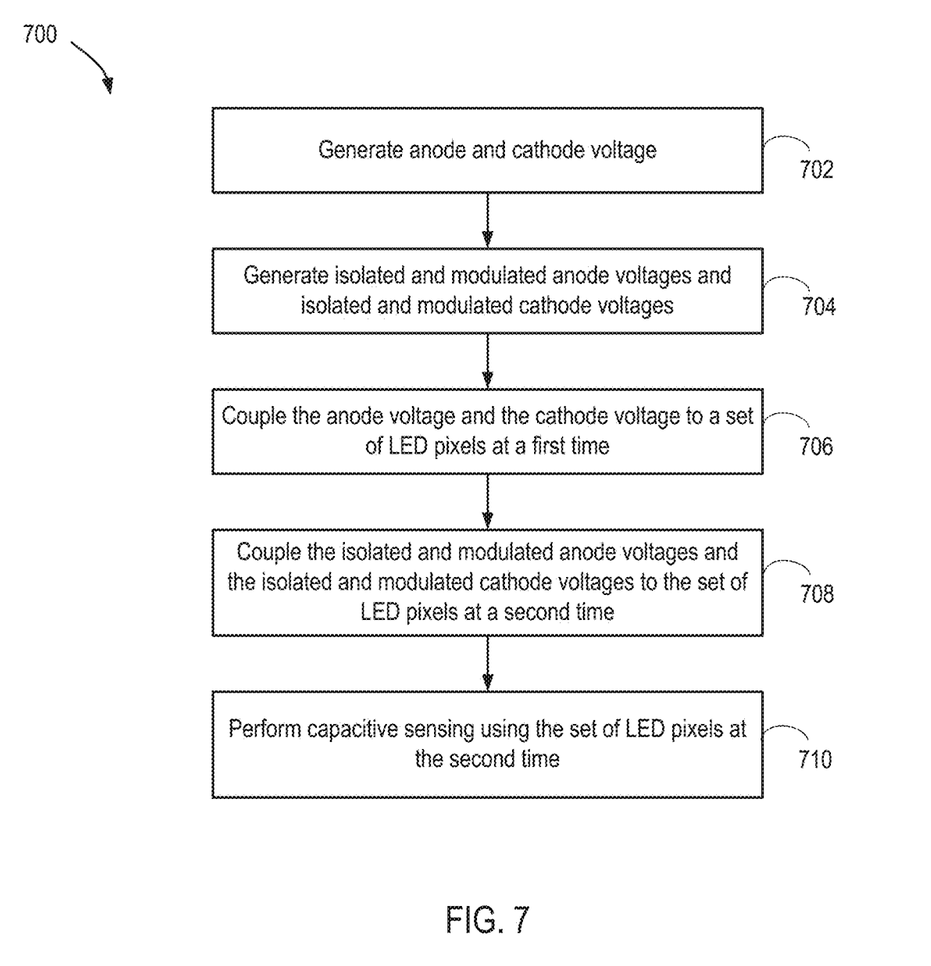
FIG. 7 is a flow diagram depicting a method of driving an integrated display and capacitive sensing device according to an absolute capacitive embodiment.

FIG. 7 is a flow diagram depicting a method 700 of driving an integrated display and capacitive sensing device according to an embodiment. The method 700 begins at step 702, where the processing system 110 generates an anode voltage and a cathode voltage for a display LED. For example, as discussed above, the power supply 226 generates the Vdd and Vss anode and cathode voltages.

At step 704, the processing system 110 generates isolated and modulated anode voltages and isolated and modulated cathode voltages from the anode voltage and the cathode voltage. For example, the isolated and modulated anode voltages and isolated and modulated cathode voltages can be generated by the isolated supply domains 218.

At step 706, the processing system 110 couples the anode voltage and the cathode voltage to a set of LED display pixels 204 at a first time. At step 708a, the processing system 110 couples the isolated and modulated anode voltages and the isolated and modulated cathode voltages to the set of LED pixels 204 at a second time. At step 710, the processing system 110 performs capacitive sensing using the set of LED pixels 204 at the second time.

Figure 8:
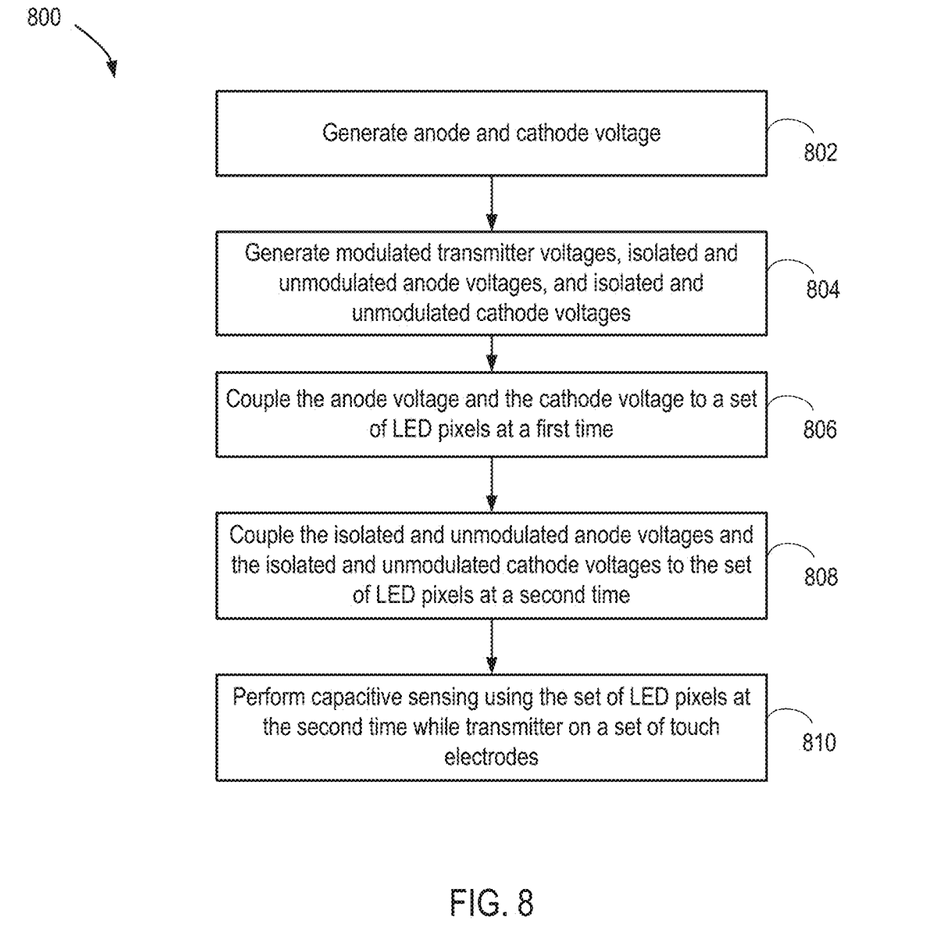
FIG. 8 is a flow diagram depicting a method of driving an integrated display and capacitive sensing device according to a trans capacitive embodiment.

FIG. 8 is a flow diagram depicting a method 800 of driving an integrated display and capacitive sensing device according to a transcapacitive embodiment. The method 800 begins at step 802, where the processing system 110 generates an anode voltage and a cathode voltage for a display LED. For example, as discussed above, the power supply 226 generates the Vdd and Vss anode and cathode voltages.

At step 804, the processing system 110 generates modulated transmitter voltages, isolated and unmodulated anode voltages and isolated and unmodulated cathode voltages from the anode voltage and the cathode voltage. For example, the isolated and unmodulated anode voltages and isolated and unmodulated cathode voltages can be generated by the isolated supply domains 218.

At step 806, the processing system 110 couples the anode voltage and the cathode voltage to a set of LED pixels 204 at a first time. At step 808, the processing system 110 couples the isolated and unmodulated anode voltages and the isolated and unmodulated cathode voltages to the set of LED pixels 204 at a second time. At step 810, the processing system 110 performs capacitive sensing receiving on the set of LED pixels 204 at the second time while transmitting on a set of touch electrodes.

There are various embodiments of steps 706-710 and steps 806-810. In an embodiment, the set of LED pixels 204 includes all of the LED pixels 204. In other embodiments, the set of LED pixels 204 includes a portion of the LED pixels 204 (e.g., a column of LED pixels, a row of LED pixels, or some other grouping of LED pixels). In such embodiments, steps 706-710 and 806-810 can be repeated for different sets of the LED pixels 204 to obtain values for all touch nodes 125 and form a complete capacitive image. In some embodiments, the processing system 110 performs capacitive sensing using the cathode electrodes of the set of LED pixels 204. In other embodiments, the processing system 110 performs capacitive sensing using the anode electrodes of the set of LED pixels 204. In some embodiments, the processing system 110 performs capacitive absolute capacitive sensing using electrodes of the of LED pixels 204. In other embodiments, the processing system 110 performs transcapacitive sensing using electrodes of the LED pixels 204 as receivers and touch electrodes 210 as transmitters. In some embodiments, the processing system 110 performs capacitive sensing concurrently with display updating. In other embodiments, the processing system 110 performs capacitive sensing during non-display update periods (e.g., horizontal blanking periods, long horizontal blanking periods, vertical blanking periods, etc.). In some embodiments, the processing system 110 also modulates the gate and/or source electrodes of the display 202 while performing capacitive sensing.

The embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

We claim:

1. A processing system for an input device, the processing system comprising:
   isolated supply domains comprising circuitry, the isolated supply domains configured to:
      receive an anode voltage and a cathode voltage; and
      supply modulated anode voltages, and modulated cathode voltages; and
   a multiplexer configured to:
      selectively supply one or more of the anode voltage and the cathode voltage, or one or more of the modulated anode voltages and the modulated cathode voltages, to one or more light-emitting diode (LED) pixels of a display, wherein the modulated anode voltages and the modulated cathode voltages are constant with respect to each other and modulated with respect to an external reference voltage.

2. The processing system of claim 1, further comprising:
   analog front ends (AFEs) comprising circuitry, wherein each of the AFEs is coupled to a respective first output or a respective second output of one of the isolated supply domains.

3. The processing system of claim 1, wherein a respective first output of each of the isolated supply domains is coupled to at least one anode electrode of the LED pixels, and a respective second output of each of the isolated supply domains is coupled to at least one cathode electrode of the LED pixels.

4. The processing system of claim 1, further comprising:
analog front ends (AFEs) comprising circuitry, wherein the AFEs are configured to receive resulting signals from sensor electrodes that form crossings with electrodes of the LED pixels, wherein the electrodes of the LED pixels are cathode electrodes or anode electrodes.

5. The processing system of claim 1, further comprising:
a power supply configured to supply the anode voltage and the cathode voltage.

6. The processing system of claim 5, further comprising:
an analog front end (AFE) comprising circuitry, wherein the AFE is coupled to a first output of the power supply configured to supply the anode voltage or a second output of the power supply configured to supply the cathode voltage.

7. The processing system of claim 5, wherein the power supply is further configured to: supply a plurality of voltages including the anode voltage and the cathode voltage, and modulate each of the plurality of voltages, wherein the plurality of voltages are constant with respect to each other and modulated with respect to the external reference voltage.

8. The processing system of claim 7, wherein the display includes source electrodes and gate electrodes, the processing system further comprising:
display driver circuitry configured to receive at least one of the plurality of supply voltages from the power supply to drive the source electrodes, the gate electrodes, or both the source electrodes and the gate electrodes.

9. The processing system of claim 8, wherein each of the isolated supply domains further comprises voltage regulator circuitry configured to regulate at least one of the respective modulated anode voltage and the respective modulated cathode voltage.

10. The processing system of claim 9, wherein each of the isolated supply domains further comprises voltage regulator circuitry configured to regulate at least one of the respective modulated anode voltage and the respective modulated cathode voltage.

11. An input device, comprising:
a display having light-emitting diode (LED) pixels; and
a processing system, including:
isolated supply domains comprising circuitry, the isolated supply domains comprising:
inputs configured to receive an anode voltage and a cathode voltage;
first outputs configured to supply modulated anode voltages; and
second outputs configured to supply modulated cathode voltages,
a multiplexer circuit configured
selectively supply one or more of the anode voltage and the cathode voltage, or one or more of the modulated anode voltages and the modulated cathode voltages, to the LED pixels, wherein the modulated anode voltages and the modulated cathode voltages are constant with respect to each other and modulated with respect to an external reference voltage.

12. The input device of claim 11, wherein the processing system further comprises:
analog front ends (AFEs) comprising circuitry, wherein each of the AFEs is coupled to a respective first output or a respective second output of one of the isolated supply domains.

13. The input device of claim 12, wherein the respective first output of each of the isolated supply domains is coupled to at least one anode electrode of the LED pixels, and the respective second output of each of the isolated supply domains is coupled to at least one cathode electrode of the LED pixels.

14. The input device of claim 11, further comprising:
sensor electrodes disposed on a layer of the display;
wherein the processing system further comprises analog front ends (AFEs) configured to receive resulting signals from the sensor electrodes that form crossings with electrodes of the LED pixels, wherein the electrodes of the LED pixels are cathode electrodes or anode electrodes.

15. The input device of claim 11, wherein the processing system further comprises:
a power supply having configured to supply: the anode voltage; and the cathode voltage.

16. The input device of claim 15, wherein the processing system further comprises:
an analog front end (AFE) comprising circuitry, wherein the AFE is coupled to the first output or the second output of the power supply.

17. A method of driving an integrated display and capacitive sensing device, the display including light-emitting diode (LED) pixels, the method comprising: comprising:
generating an anode voltage and a cathode voltage;
generating, from the anode voltage and the cathode voltage, isolated and modulated anode voltages and isolated and modulated cathode voltages, wherein the isolated and modulated anode voltages and the isolated and modulated cathode voltages are constant with respect to each other and modulated with respect to an external reference voltage;
coupling the anode voltage and the cathode voltage to the LED pixels at a first time;
coupling the isolated anode voltages and the isolated cathode voltages the LED pixels at a second time; and
performing capacitive sensing using the LED pixels at the second time.

18. The method of claim 17, wherein the step of performing capacitive sensing comprises:
generating resulting signals using analog front ends (AFEs) having circuitry, the AFES are coupled to anode electrodes or cathode electrodes of the LED pixels.

19. The method of claim 17, wherein the step of performing capacitive sensing comprises:
generating resulting signals using analog front ends (AFEs) having circuitry, wherein the AFES are coupled to sensor electrodes that form crossings with electrodes of the LED pixels, wherein the electrodes of the LED pixels are cathode electrodes or anode electrodes.

20. The method of claim 17, further comprising:
driving electrodes of the integrated display and capacitive sensing device with a modulated voltage while performing the capacitive sensing, wherein the electrodes include source electrodes, gate electrodes, or both source electrodes and gate electrodes.

* * * * *

UNITED STATES PATENT AND TRADEMARK OFFICE
CERTIFICATE OF CORRECTION

PATENT NO. : 10,146,388 B2
APPLICATION NO. : 15/452274
DATED : December 4, 2018
INVENTOR(S) : Joseph Kurth Reynolds and Stephen L. Morein Page 1 of 1

It is certified that error appears in the above-identified patent and that said Letters Patent is hereby corrected as shown below:

In the Specification

Column 4, Line 22, delete "ohm ically" and insert -- ohmically --, therefor.

Column 10, Line 66, delete "current-conveyer," and insert -- current conveyer, --, therefor.

Column 14, Line 14, After "the" delete "of".

In the Claims

Claim 9, Column 15, approximately Lines 31-35, delete "The processing system of claim 8, wherein each of the isolated supply domains further comprises voltage regulator circuitry configured to regulate at least one of the respective modulated anode voltage and the respective modulated cathode voltage." and insert -- The processing system of claim 1, wherein each of the isolated supply domains comprises a switched-capacitor power isolator configured to receive the anode voltage and the cathode voltage and generate a respective one of the modulated anode voltages and a respective one of the modulated cathode voltages. --, therefor.

Claim 17, Column 16, Line 29, delete "comprising: comprising:" and insert -- comprising: --, therefor.

Claim 17, Column 16, Line 40, after "voltages" insert -- to --.

Claim 18, Column 16, Line 47, delete "AFES" and insert -- AFEs --, therefor.

Claim 19, Column 16, Line 52, delete "AFES" and insert -- AFEs --, therefor.

Signed and Sealed this
Twenty-eighth Day of April, 2020

Andrei Iancu
*Director of the United States Patent and Trademark Office*